(12) United States Patent
Harth et al.

(10) Patent No.: US 12,687,399 B2
(45) Date of Patent: Jul. 21, 2026

(54) RANKING VEHICLE CHARGING STATIONS

(71) Applicant: VOLVO TRUCK CORPORATION, Gothenburg (SE)

(72) Inventors: Virginie Harth, St Didier de Formans (FR); Ulf Danielsson, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 85 days.

(21) Appl. No.: 18/824,174

(22) Filed: Sep. 4, 2024

(65) Prior Publication Data

US 2025/0085117 A1 Mar. 13, 2025

(30) Foreign Application Priority Data

Sep. 11, 2023 (EP) ...................................... 23196645

(51) Int. Cl.
| | |
|---|---|
| *G01C 21/30* | (2006.01) |
| *G01C 21/34* | (2006.01) |
| *G06Q 50/06* | (2024.01) |

(52) U.S. Cl.
CPC ......... *G01C 21/30* (2013.01); *G01C 21/3461* (2013.01); *G01C 21/3469* (2013.01); *G06Q 50/06* (2013.01)

(58) Field of Classification Search
CPC G01C 21/30; G01C 21/3461; G01C 21/3469; G06Q 50/06
USPC ........................................................ 701/533
See application file for complete search history.

(56) References Cited

U.S. PATENT DOCUMENTS

| | | | |
|---|---|---|---|
| 11,203,268 B2 * | 12/2021 | Singuru ................... | B60L 58/12 |
| 2015/0066258 A1 * | 3/2015 | Loftus ................ | G01C 21/3469 |
| | | | 701/22 |
| 2015/0115886 A1 | 4/2015 | Loftus et al. | |
| 2019/0205842 A1 * | 7/2019 | Starns .................... | G06Q 10/20 |
| 2020/0039370 A1 | 2/2020 | Hom et al. | |

(Continued)

FOREIGN PATENT DOCUMENTS

| | | | | |
|---|---|---|---|---|
| CA | 2819441 A1 * | 2/2014 | ............. | G01C 21/30 |
| DE | 102020112436 A1 | 11/2021 | | |

(Continued)

OTHER PUBLICATIONS

Non Final Office Action dated May 1, 2025 in corresponding U.S. Appl. No. 18/421,452, 18 pages.

(Continued)

*Primary Examiner* — Tuan C To
(74) *Attorney, Agent, or Firm* — Jeffri A. Kaminski; Venable LLP

(57) ABSTRACT

A computer system has a processor device configured to, for each vehicle charging station in a set of vehicle charging stations: receive topography data indicative of elevations within a predefined area around the vehicle charging station; determine, based on the topography data, a maximum possible altitude drop in relation to the vehicle charging station within the area; and determine, based on the maximum possible altitude drop, a vehicle station ranking metric for the vehicle charging station, wherein the vehicle station ranking metric is determined in such a way that a vehicle charging station with a relatively large first maximum possible altitude drop is ranked lower than a vehicle charging station with a relatively small second maximum possible altitude drop.

12 Claims, 5 Drawing Sheets

(56)                References Cited

U.S. PATENT DOCUMENTS

2020/0161874  A1      5/2020   Ito
2021/0001834  A1      1/2021   Kim
2021/0061120  A1      3/2021   Park et al.
2021/0213844  A1 *    7/2021   Singuru  .............. H02J 7/00034
2021/0261016  A1 *    8/2021   Kledewski  .............. B60L 53/62
2022/0089056  A1      3/2022   Rajmohan et al.
2022/0228877  A1 *    7/2022   Feldman  ............ G01C 21/3476
2022/0396172  A1 *   12/2022   Klein  ...................... B60L 53/68
2024/0010089  A1 *    1/2024   Williams  ................ B60L 53/35
2024/0253520  A1 *    8/2024   Danielsson  .............. B60L 7/10

FOREIGN PATENT DOCUMENTS

DE       102020118922  A1      1/2022
JP          2020178428  A     10/2020
KR          102054925  B1     12/2019

OTHER PUBLICATIONS

Notice of Allowance dated Oct. 15, 2025 in corresponding U.S.
Appl. No. 18/421,452, 13 pages.
Extended European Search Report in corresponding European Appli-
cation No. 23196645.8 dated Mar. 4, 2024 (7 pages).
Extended European Search Report in corresponding European Appli-
cation No. 23153910.7 dated Jun. 19, 2023 (8 pages).

* cited by examiner

RANKING VEHICLE CHARGING STATIONS

TECHNICAL FIELD

The disclosure relates generally to assisting route planning. In particular aspects, the disclosure relates to ranking vehicle charging stations, for charging an electric vehicle. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

Vehicles with an electric drive train may need to be charged at one or several vehicle charging stations along a route. The route, and/or which vehicle charging station(s) to use, may be determined using a route/charging planning system.

The large weight of an electrified heavy duty vehicle may require special consideration in the route planning, compared to an electrified car. In particular, it may be desirable to enable for route planning where sufficient margin remains for regenerative braking, without unnecessarily restricting the maximum allowed charging level of the high voltage batteries of the vehicle.

SUMMARY

According to a first aspect of the disclosure, it is provided a computer system comprising a processor device configured to, for each vehicle charging station in a set of vehicle charging stations: receive topography data indicative of elevations within a predefined area around the vehicle charging station; determine, based on the topography data, a maximum possible altitude drop in relation to the vehicle charging station within the area; and determine, based on the maximum possible altitude drop, a vehicle station ranking metric for the vehicle charging station, wherein the vehicle station ranking metric is determined in such a way that a vehicle charging station with a first relatively large maximum possible altitude drop is ranked lower than a vehicle charging station with a second relatively small maximum possible altitude drop. The first aspect of the disclosure may seek to improve the ability of the driver, or the vehicle, to plan a better route and/or a route that provides improved safety and/or time efficiency. A technical benefit may include that the computer system according to the first aspect allows for indication to the driver and/or vehicle that a vehicle charging station with a relatively large first maximum possible altitude drop is ranked lower than a vehicle charging station with a relatively small second maximum possible altitude drop, smaller than the first maximum possible altitude drop. This allows the driver and/or vehicle to plan a route where the vehicle charging station with the relatively small second maximum possible altitude drop is prioritized over the vehicle charging station with the relatively large first maximum possible altitude drop. This, in turn, reduces the risk of the heavy duty vehicle becoming fully charged at a location (the location of the vehicle charging station with the relatively large first maximum possible altitude drop) from which a substantial descent is possible, which could result in substantial load on the service brakes, possibly resulting in brake fading or at least excessive wear of the service brakes. Alternatively, the above-mentioned prioritization may allow the vehicle to charge to a higher state of charge at the selected vehicle charging station (the location of the vehicle charging station with the relatively small second maximum possible altitude drop), which may result in a shorter time required for the route depending on the driving cycle and weight conditions. The computer system according to the first aspect of the disclosure thus provides for improved route planning for an electrified heavy duty vehicle without requiring information about the detailed route and without information about the present position of the vehicle. The only information that is required is the topography data indicative of elevations within a predefined area around each vehicle charging station in a set of vehicle charging stations. This may make it easier for the driver to start to plan a route and/or select charging stops, because no additional information may need to be provided by the driver to the computer system. Furthermore, fewer computational operations may be needed, which may reduce the time to provide the information for the route planning and/or requirements on communication bandwidth. The latter may, for example, facilitate route planning and/or selection of charging stops when a driver is located in a remote area without access to high-capacity mobile internet services.

In some examples, including in at least one preferred example, optionally the processor device may be configured to provide data adapted to control a display device to present each vehicle charging station in the set of vehicle charging stations using a presentation format being indicative of the vehicle charging station ranking metric for the vehicle charging station. A technical benefit may include to simplify for the driver, or other person, to perform the route planning. The display device may, for example, be included in the vehicle or in a personal communication device, such as a mobile phone. The data provided by the processor device of the computer system may, for example, be transmitted to the vehicle and/or personal communication device, for instance wirelessly.

In some examples, including in at least one preferred example, optionally the vehicle station ranking metric may be additionally based on a distance from the vehicle charging station to a position within the area defining the maximum altitude drop, wherein the vehicle station ranking metric is determined in such a way that, for a given maximum possible altitude drop, a vehicle charging station with a first relatively small distance to the position defining the maximum altitude drop is ranked lower than a vehicle charging station with a second relatively large distance to the position defining the maximum altitude drop. A technical benefit may include to provide for improved precision in the ranking of the vehicle charging stations. A substantial altitude drop within a smaller radius around the position of the vehicle charging station would increase the chance of regeneration being needed shortly after charging, so that a lower maximum charging limit may be required to be set for such a vehicle charging station than for a vehicle charging station with the substantial altitude drop within a larger radius.

In some examples, including in at least one preferred example, optionally the maximum possible altitude drop for each vehicle charging station may be determined as a maximum altitude drop among altitude drops along the possible road-bound routes starting from the charging station. A technical benefit may include to provide for improved precision in the ranking of the vehicle charging stations.

In some examples, including in at least one preferred example, optionally the processor device may be configured to, for each vehicle charging station in the set of vehicle charging stations: determine, based on the maximum possible altitude drop within the area, a measure indicative of a maximum allowable charging level for a vehicle charging at the vehicle charging station, wherein the measure indicative of the maximum allowable charging level is determined in such a way that the maximum allowable charging level at a first vehicle charging station with a first relatively large maximum possible altitude drop is lower than the maximum allowable charging level at a second vehicle charging station with a second relatively small maximum possible altitude drop. A technical benefit may include that the driver may be presented with a metric (the maximum allowable charging level) for each different vehicle charging station that will be easy for the driver to understand, and that will make it possible for the driver to relatively easily make informed decisions relating to the route planning. For instance, the driver may know from experience that a reduction of the maximum allowable charging level to, say, 90% may not have substantial impact on the selection of vehicle charging stations due to the time that may be required to charge from 90% to 100%, depending on the properties of the vehicle. Furthermore, the driver will be aware that with a lower charging level, it will be possible to regenerate more in the downhill, and reduce the energy waste in the service brakes. On the other hand, a full charge may be considered necessary, or the charging stop in question may coincide with a longer brake, which may cause the driver to select another vehicle charging station with a higher maximum allowable charging level.

In some examples, including in at least one preferred example, optionally the processor device may be configured to receive data indicative of a weight of the vehicle; and determine, for each vehicle charging station in the set of vehicle charging stations, the maximum allowable charging level additionally based on the weight of the vehicle. A technical benefit may include that the maximum charging level penalty for vehicle charging stations with a substantial altitude drop within the area may be adapted to the weight of the vehicle. If the vehicle is, for example, loaded with low-density cargo, it may not be necessary to reduce the maximum charging level as much, or at all, for a vehicle charging station with a substantial altitude drop within the area. If, on the other hand, the vehicle is very heavy, it may be that the maximum charging level should be reduced even more significantly than in a general case for an average type of cargo situation.

The computer system according to various examples or combinations of examples may advantageously be included in a route planning system, for assisting a driver of an electric vehicle in planning a route, further comprising: a display arrangement including a display device and a display controller, the display controller being configured to receive, from the computer system, data adapted to control the display device to present each vehicle charging station in the set of vehicle charging stations using a presentation format being indicative of the vehicle charging station ranking metric for the vehicle charging station.

The computer system according to various examples or combinations of examples may advantageously be included in a vehicle, further comprising a display arrangement including a display device and a display controller, the display controller being configured to receive, from the computer system, data adapted to control the display device to present each vehicle charging station in the set of vehicle charging stations using a presentation format being indicative of the vehicle charging station ranking metric for the vehicle charging station.

According to a second aspect of the disclosure, there is provided a computer implemented method, comprising, for each vehicle charging station in a set of vehicle charging stations: receiving, by processing circuitry of a computer system, topography data indicative of elevations within a predefined area around the vehicle charging station; determining, based on the topography data, a maximum possible altitude drop in relation to the vehicle charging station within the area; and determining, based on the maximum possible altitude drop, a vehicle station ranking metric for the vehicle charging station, wherein the vehicle station ranking metric is determined in such a way that a vehicle charging station with a first relatively large maximum possible altitude drop is ranked lower than a vehicle charging station with a second relatively small maximum possible altitude drop. A technical benefit may include that the method according to the second aspect allows for indication to the driver and/or vehicle that a vehicle charging station with a relatively large first maximum possible altitude drop is ranked lower than a vehicle charging station with a relatively small second maximum possible altitude drop, smaller than the first maximum possible altitude drop. This allows the driver and/or vehicle to plan a route where the vehicle charging station with the relatively small second maximum possible altitude drop is prioritized over the vehicle charging station with the relatively large first maximum possible altitude drop. This, in turn, reduces the risk of the heavy duty vehicle becoming fully charged at a location (the location of the vehicle charging station with the relatively large first maximum possible altitude drop) from which a substantial descent is possible, which could result in substantial load on the service brakes, possibly resulting in brake fading or at least excessive wear of the service brakes, in addition to the waste of energy resulting from a missed opportunity of brake energy regeneration. Alternatively, the above-mentioned prioritization may allow the vehicle to charge to a higher state of charge at the selected vehicle charging station (the location of the vehicle charging station with the relatively small second maximum possible altitude drop), which may result in a shorter time required for the route depending on the driving cycle and weight conditions. The method according to the second aspect of the disclosure thus provides for improved route planning for an electrified heavy duty vehicle without requiring information about the detailed route and without information about the present position of the vehicle. The only information that is required is the topography data indicative of elevations within a predefined area around each vehicle charging station in a set of vehicle charging stations. This may make it easier for the driver to start to plan a route, because no additional information may need to be provided by the driver to the computer system. Furthermore, fewer computational operations may be needed, which may reduce the time to provide the information for the route planning and/or requirements on communication bandwidth. The latter may, for example, facilitate route planning when a driver is located in a remote area without access to high-capacity mobile internet services.

In some examples, including in at least one preferred example, optionally the method may comprise providing data adapted to control a display device to present each vehicle charging station in the set of vehicle charging stations using a presentation format being indicative of the vehicle charging station ranking metric for the vehicle charging station.

In some examples, including in at least one preferred example, optionally the method may comprise determining the vehicle station ranking metric additionally based on a distance from the vehicle charging station to a position within the area defining the maximum altitude drop, wherein the vehicle station ranking metric is determined in such a way that, for a given maximum possible altitude drop, a vehicle charging station with a first relatively small distance to the position defining the maximum altitude drop is ranked lower than a vehicle charging station with a second relatively large distance to the position defining the maximum altitude drop.

In some examples, including in at least one preferred example, optionally the received topography data for each vehicle charging station may include road topography data for possible road-bound routes starting from the vehicle charging station.

In some examples, including in at least one preferred example, optionally the maximum possible altitude drop for each vehicle charging station may be determined as a maximum altitude drop among altitude drops along the possible road-bound routes starting from the vehicle charging station.

According to a third aspect of the disclosure, there is provided a computer program product comprising program code for performing, when executed by the processing circuitry comprised in the computer system of the first aspect, the method of the second aspect.

According to a fourth aspect of the disclosure, there is provided a non-transitory computer-readable storage medium comprising instructions, which when executed by the processing circuitry comprised in the computer system of the first aspect, cause the processing circuitry to perform the method of the second aspect.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

BRIEF DESCRIPTION OF THE DRAWINGS

Examples are described in more detail below with reference to the appended drawings.

FIG. 1 is an illustration of a schematic presentation format provided by a route planning system according to an example.

FIG. 2A-C are exemplary illustrations of topographies around examples of vehicle charging stations.

DETAILED DESCRIPTION

The detailed description set forth below provides information and examples of the disclosed technology with sufficient detail to enable those skilled in the art to practice the disclosure.

Figures 1, 2A:
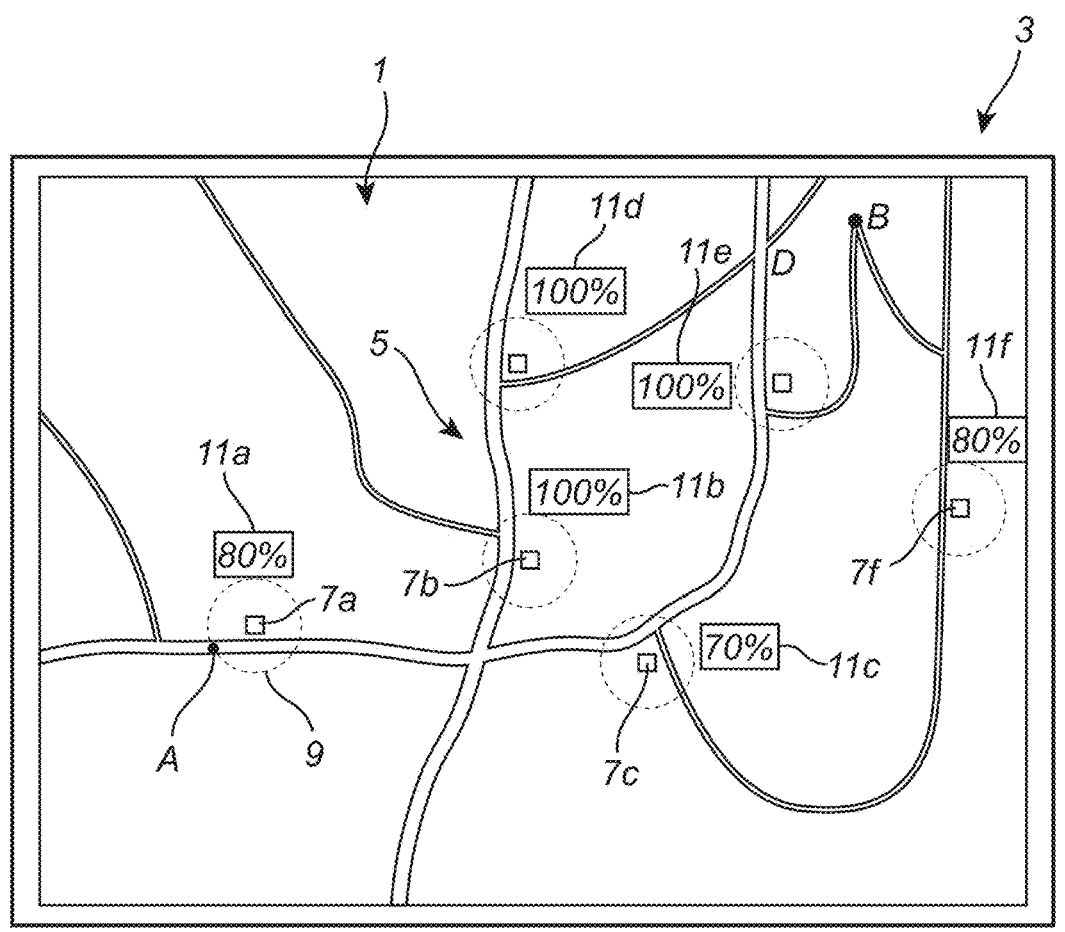

FIG. 1 is an illustration of a schematic presentation format provided by a route planning system according to an example. In the schematic presentation format in FIG. 1, a 2D map image 1 is displayed on a display device 3. The map image 1 includes a road network 5, a starting point A, an end point B, and a number of vehicle charging stations 7a-f. Around each vehicle charging station 7a-f, a near-zone area 9 is schematically indicated (only one of the near-zone areas is indicated by a reference numeral in FIG. 1 to avoid cluttering the drawing). The near-zone area 9 may have the same size around each of the vehicle charging stations 7a-f. According to an example, the near-zone area 9 may be 50 km, but other sizes may be suitable depending on various factors.

The present disclosure is at least partly based on the realization that automatic route planning for an electric vehicle is still difficult, for example because of the large number of unknown parameters affecting the energy consumption of the vehicle, such as weather conditions, road conditions, topography, driver behavior, etc. Where the electric vehicle is a heavy duty truck, additional factors come into play, such as the weight and shape of the cargo. For instance, the weight may influence both the power consumption and the regeneration performance, and the shape of the cargo may strongly influence the aerodynamic drag. For these and other reasons, the present inventors see a need for assisting the driver in manually planning the route, for example between the starting point A and the end point B in FIG. 1. From the kind of conventional 2D map image in FIG. 1, the driver cannot get an understanding of the elevation of the different vehicle charging stations 7a-f, and also not of the topography in the vicinity of the vehicle charging stations 7a-f, schematically indicated by the near-zone area 9. The inventors have realized that there may be need to limit the maximum allowable charging level depending on the topography within the near-zone area 9 around a vehicle charging station 7a-f, to ensure sufficient margin in the high-voltage batteries allowing regenerative braking if descending from the vehicle charging station 7a-f along a route with a substantial altitude drop. In the route planning stage, this is important information for the driver, and the present disclosure therefore proposes to automatically determine a maximum altitude drop in relation to each vehicle charging station 7a-f, within its near-zone area 9, and to determine a vehicle station ranking metric for each vehicle charging station 7a-f based on this maximum altitude drop. In one example, as is schematically indicated in FIG. 1, the vehicle station ranking metric may be translated into a maximum allowable charging level 11a-f for the particular vehicle at each of the vehicle charging stations 7a-f. In FIG. 1, the maximum allowable charging level 11a-f is indicated as percentage figures, but many other representations are possible.

FIGS. 2A-C are exemplary illustrations of topographies around examples of vehicle charging stations. FIG. 2A is an exemplary illustration of the topography around vehicle charging station 7a in FIG. 1. In this example, two roads 5a, 5b are shown leading to/from the vehicle charging station 7a, and the vehicle charging station 7a is at a relatively high elevation within the near-zone area 9. FIG. 2B is an exemplary illustration of the topography around vehicle charging station 7b in FIG. 1. In this example, one road 5c (motorway) is shown as providing access to the vehicle charging station 7b, and the vehicle charging station 7b is at a relatively low elevation within the near-zone area 9. FIG. 2C is an exemplary illustration of the topography around vehicle charging station 7c in FIG. 1. In this example, two roads 5d, 5e are shown leading to/from the vehicle charging station 7c, and the vehicle charging station 7c is at a relatively high elevation within the near-zone area 9. As can be seen by comparing the three schematic exemplary topographies in FIGS. 2A-C, the maximum possible altitude drop Ha in relation to the vehicle charging station 7a within the near-zone area 9 centered at the vehicle charging station 7a is substantially the same as the maximum possible altitude drop Hc in relation to the vehicle charging station 7c within the near-zone area 9 centered at the vehicle charging station 7c, while the maximum possible altitude drop Hb in relation to the vehicle charging station 7b within the near-zone area 9 centered at the vehicle charging station 7b is negligible. It can also be seen that the position Pc defining the maximum possible altitude drop Hc in relation to the vehicle charging station 7c is at a smaller horizontal distance from the vehicle charging station 7c than the position Pa defining the maximum possible altitude drop Ha in relation to the vehicle charging station 7a (Da).

Figure 3A:
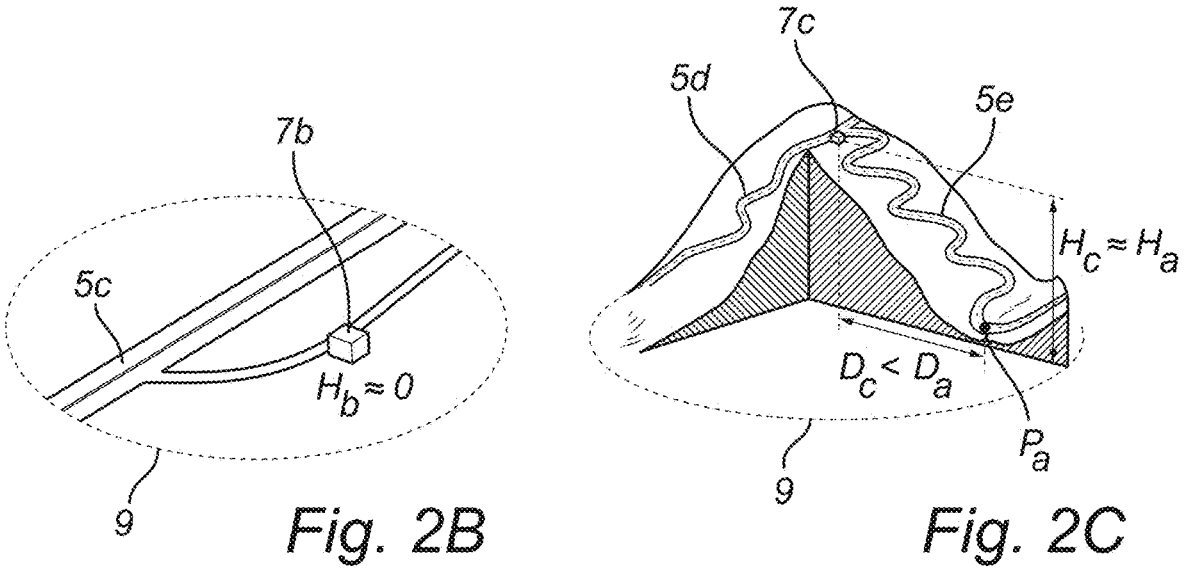
FIG. 3A is an exemplary route planning system according to an example.
Figure 3A:
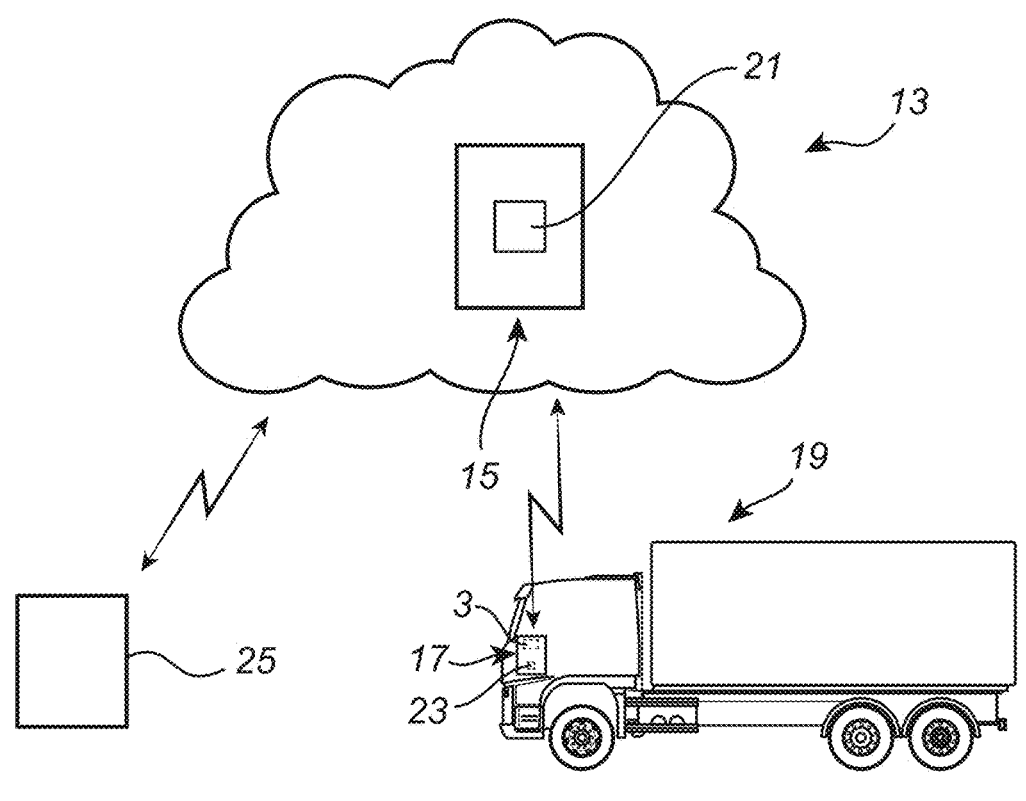

FIG. 3A is an exemplary route planning system 13 according to an example. The route planning system 13 comprises a computer system 15, here exemplified as being part of a cloud solution, and a display arrangement 17, here shown as being included in an electrified heavy duty vehicle 19. As is schematically indicated in FIG. 3A, the computer system 15 comprises a processor device 21, and the display arrangement 17 comprises a display device 3 and a display controller 23. Additionally referring to FIG. 1 and FIGS. 2A-C, the processor device 21 of the computer system 15 is configured to, for each vehicle charging station 7a-f in a set of vehicle charging stations, receive, for example from a map database 25, topography data indicative of elevations within a predefined near-zone area 9 around the vehicle charging station, determine, based on the topography data, a maximum possible altitude drop Ha, Hb, Hc, in relation to the vehicle charging station within the area 9, and determine, based on the maximum possible altitude drop Ha Hb, Hc, a vehicle station ranking metric for the vehicle charging station 7a-f, wherein the vehicle station ranking metric is determined in such a way that a vehicle charging station with a relatively large first maximum possible altitude drop is ranked lower than a vehicle charging station with a relatively small second maximum possible altitude drop. According to example, the processor device 21 may be configured to determine the ranking metric additionally based on a distance Da, Dc from the vehicle charging station 7a-f to a position Pa, Pc within the area 9 defining the maximum altitude drop Ha, Hb, Hc, wherein the vehicle station ranking metric is determined in such a way that, for a given maximum possible altitude drop, a vehicle charging station with a first relatively small distance to the position defining the maximum altitude drop is ranked lower than a vehicle charging station with a second relatively large distance to the position defining the maximum altitude drop. The topography data received by the processor device 21 from the map database 25 for each vehicle charging station may include road topography data for possible road-bound routes 5a-e starting from the charging station 7a-f, and the maximum altitude drop Ha, Hb, Hc for each vehicle charging station 7a-f may be determined as a maximum altitude drop among altitude drops along the possible road-bound routes 5a-e starting from the vehicle charging station 7a-f. According to examples, the processor device 21 may be configured to, for each vehicle charging station 7a-f in the set of vehicle charging stations: determine, based on the maximum possible altitude drop Ha, Hb, Hc within the predefined near-zone area 9, a measure indicative of a maximum allowable charging level 11a-f for a vehicle 19 charging at the vehicle charging station 7a-f, wherein the measure indicative of the maximum allowable charging level is determined in such a way that the maximum allowable charging level at a first vehicle charging station with a first relatively large maximum possible altitude drop is lower than the maximum allowable charging level at a second vehicle charging station with a second relatively small maximum possible altitude drop. The processor device 21 of the computer system 15 may further be configured to: receive data indicative of a weight of the vehicle 19; and determine, for each vehicle charging station 7a-f in the set of vehicle charging stations, the maximum allowable charging level 11a-f additionally based on the weight of the vehicle 19. The data indicative of the weight of the vehicle 19 may, for example, be determined by the vehicle 19 and transmitted by the vehicle 19 to the processor device 21 of the computer system 15. The processor device 21 of the computer system 15 may be configured to provide data adapted to control the display device 3 in the vehicle 19 to present each vehicle charging station 7a-f in the set of vehicle charging stations using a presentation format being indicative of the vehicle charging station ranking metric for the vehicle charging station. The display controller 23 of the display arrangement 17 in the vehicle 10 may be configured to receive, from the computer system 15, the data adapted to control the display device 3 to present each vehicle charging station 7a-f in the set of vehicle charging stations using a presentation format being indicative of the charge station ranking metric for the vehicle charging station 7a-f, for example as is schematically indicated in FIG. 1.

Figures 3B, 4:
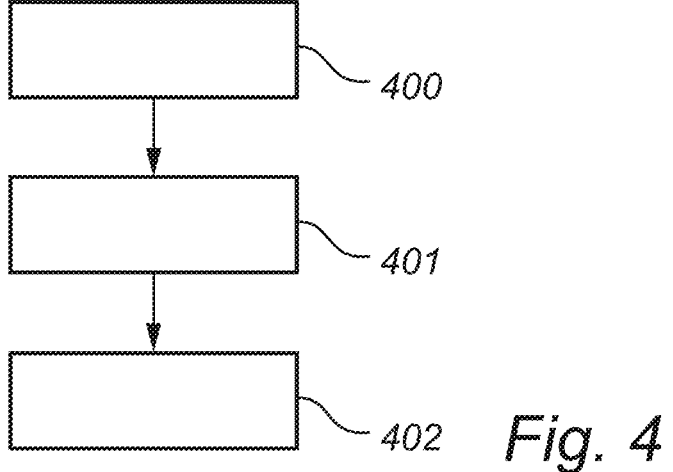
FIG. 3B is an exemplary route planning system according to an example.
FIG. 4 is an exemplary method according to an example.

FIG. 3B is an exemplary route planning system 13 according to an example. The route planning system 13 in FIG. 3B differs from that in FIG. 3A in that the display arrangement 17 is here shown as being included in a mobile communication device 27 of a driver 29 (or another person who may be planning the route for the driver).

FIG. 4 is an exemplary computer implemented method according to an example. Referring to the flow-chart in FIG. 4, the following steps may be carried out for each vehicle charging station 7a-f in a set of vehicle charging stations. In a first step 400, topography data indicative of elevations within a predefined area 9 around the vehicle charging station 7a-f is received by processing circuitry 21 of a computer system 15. In the next step 401, it is determined by the processing circuitry 21 based on the topography data, a maximum possible altitude drop Ha, Hb, Hc in relation to the vehicle charging station 7a-f within the area 9. Subsequently, in step 402, it is determined by the processing circuitry 21 based on the maximum possible altitude drop, a vehicle station ranking metric for the vehicle charging station 7a-f, wherein the vehicle station ranking metric is determined in such a way that a vehicle charging station with a first relatively large maximum possible altitude drop is ranked lower than a vehicle charging station with a second relatively small maximum possible altitude drop. The final step 402 may be carried for one vehicle charging station 7a-f at a time based on a predefined set of rules. Alternatively, or in combination, the final step 402 may be, at least partly, carried out when the maximum possible altitude drops Ha, Hb, Hc have been determined for all vehicle charging stations 7a-f in the set.

Figure 5:
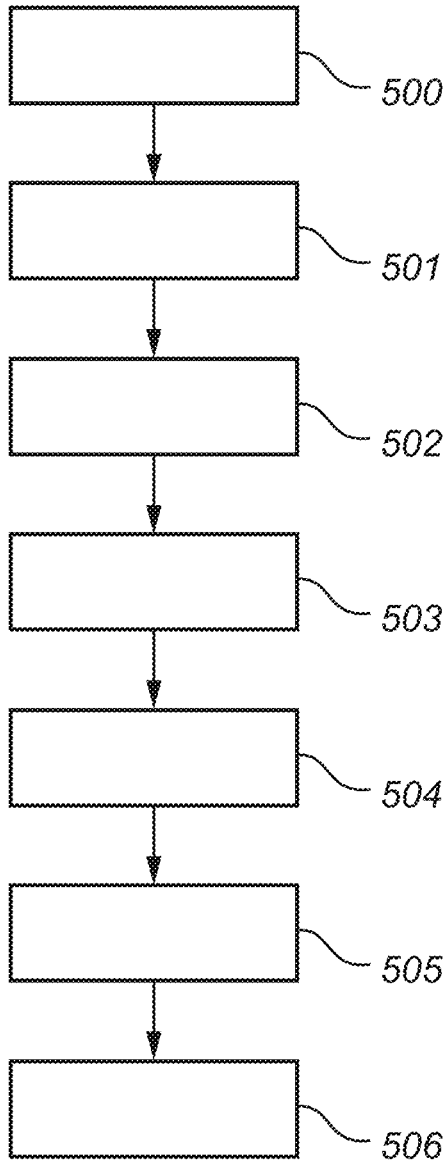
FIG. 5 is an exemplary method according to an example.

FIG. 5 is an exemplary method according to an example. The first two steps 500-501 of this example method correspond to the steps 400-401 described above with reference to FIG. 4. In the third step 502, it is determined by the processing circuitry 21 of the computer system 15, based on the maximum possible altitude drop Ha Hb, Hc, a vehicle station ranking metric for the vehicle charging station 7a-f, wherein the ranking metric is additionally based on a distance Da, Dc from the vehicle charging station 7a-f to a position Pa, Pc within the area 9 defining the maximum altitude drop Ha, Hb, Hc, wherein the vehicle station ranking metric is determined in such a way that, for a given maximum possible altitude drop, a vehicle charging station with a first relatively small distance to the position defining the maximum altitude drop is ranked lower than a vehicle charging station with a second relatively large distance to the position defining the maximum altitude drop. In the subsequent step 504, the processor device 21 of the computer system 15 may receive data indicative of a weight of the vehicle 19 for which the route is to be planned. Thereafter, in step 505, it may be determined, by the processor device 21 based on the vehicle weight and the maximum possible altitude drop Ha, Hb, Hc within the predefined near-zone area 9, a measure indicative of a maximum allowable charging level 11a-f for a vehicle 19 charging at the vehicle charging station 7a-f, wherein the measure indicative of the maximum allowable charging level is determined in such a way that the maximum allowable charging level at a first vehicle charging station with a first relatively large maximum possible altitude drop is lower than the maximum allowable charging level at a second vehicle charging station with a second relatively small maximum possible altitude drop. In step 506, data may be provided, by the processor device 21 of the computer system 15 which data is adapted to control the display device 3 in the vehicle 19 for which the route is to be planned and/or to control the display device 3 in a mobile communication device 27 of the driver 29, to present each vehicle charging station 7a-f in the set of vehicle charging stations using a presentation format being indicative of the vehicle charging station ranking metric for the vehicle charging station.

Figure 6:
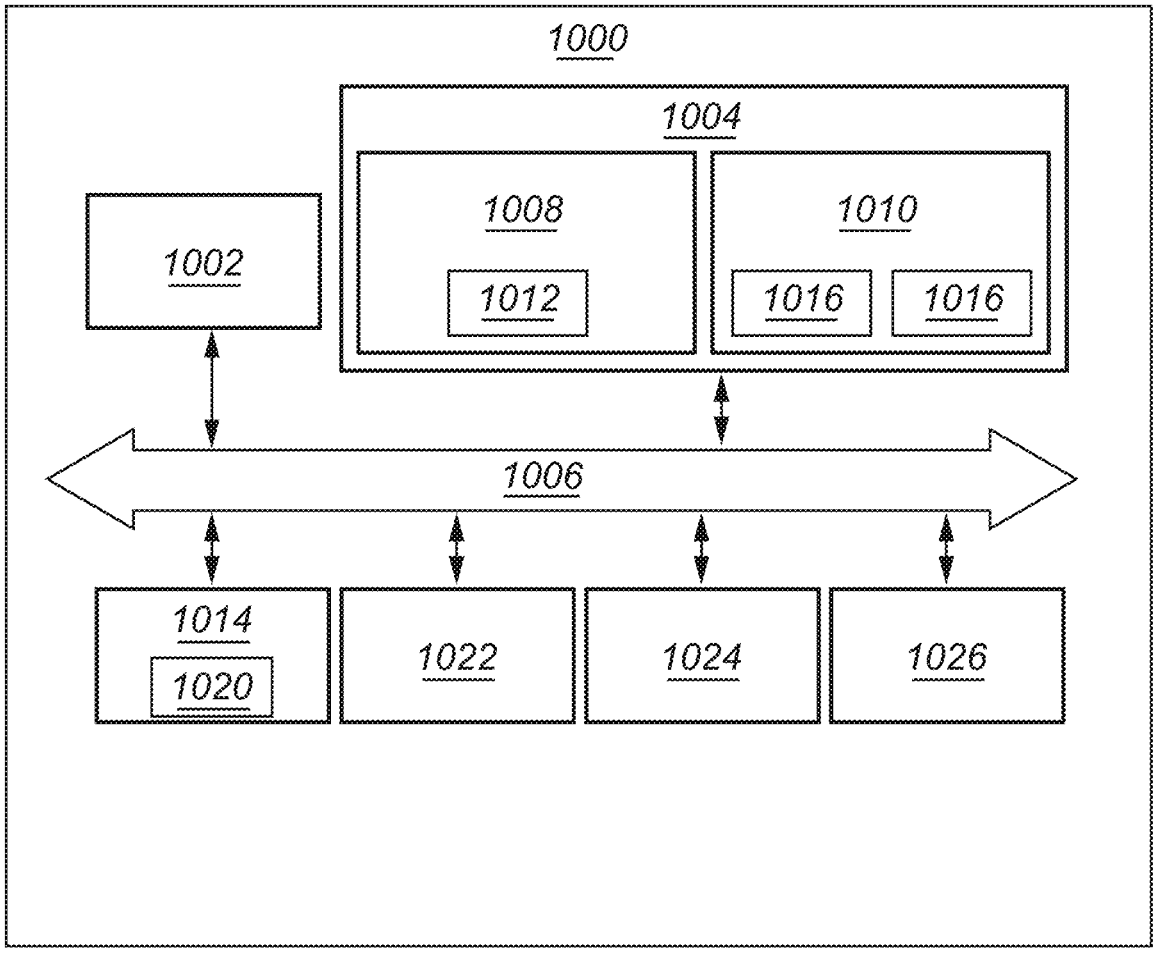
FIG. 6 is a schematic diagram of an exemplary computer system for implementing examples disclosed herein, according to an example.

FIG. 6 is a schematic diagram of a computer system 1000 for implementing examples disclosed herein, such as for implementing examples of the control circuitry 23 of the drive train arrangement 5 according to examples. The computer system 1000 is adapted to execute instructions from a computer-readable medium to perform these and/or any of the functions or processing described herein. The computer system 1000 may be connected (e.g., networked) to other machines in a LAN, an intranet, an extranet, or the Internet. While only a single device is illustrated, the computer system 1000 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 1000 may comprise at least one computing device or electronic device capable of including firmware, hardware, and/or executing software instructions to implement the functionality described herein. The computer system 1000 may include processing circuitry 1002 (e.g., processing circuitry including one or more processor devices or control units), a memory 1004, and a system bus 1006. The computer system 1000 may include at least one computing device having the processing circuitry 1002. The system bus 1006 provides an interface for system components including, but not limited to, the memory 1004 and the processing circuitry 1002. The processing circuitry 1002 may include any number of hardware components for conducting data or indication processing or for executing computer code stored in memory 1004. The processing circuitry 1002 may, for example, include a general-purpose processor, an application specific processor, a Digital indication Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 1002 may further include computer executable code that controls operation of the programmable device.

The system bus 1006 may be any of several types of bus structures that may further interconnect to a memory bus (with or without a memory controller), a peripheral bus, and/or a local bus using any of a variety of bus architectures. The memory 1004 may be one or more devices for storing data and/or computer code for completing or facilitating methods described herein. The memory 1004 may include database components, object code components, script components, or other types of information structure for supporting the various activities herein. Any distributed or local memory device may be utilized with the systems and methods of this description. The memory 1004 may be communicably connected to the processing circuitry 1002 (e.g., via a circuit or any other wired, wireless, or network connection) and may include computer code for executing one or more processes described herein. The memory 1004 may include non-volatile memory 1008 (e.g., read-only memory (ROM), erasable programmable read-only memory (EPROM), electrically erasable programmable read-only memory (EEPROM), etc.), and volatile memory 1010 (e.g., random-access memory (RAM)), or any other medium which can be used to carry or store desired program code in the form of machine-executable instructions or data structures and which can be accessed by a computer or other machine with processing circuitry 1002. A basic input/output system (BIOS) 1012 may be stored in the non-volatile memory 1008 and can include the basic routines that help to transfer information between elements within the computer system 1000.

The computer system 1000 may further include or be coupled to a non-transitory computer-readable storage medium such as the storage device 1014, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 1014 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 1014 and/or in the volatile memory 1010, which may include an operating system 1016 and/or one or more program modules 1018. All or a portion of the examples disclosed herein may be implemented as a computer program 1020 stored on a transitory or non-transitory computer-usable or computer-readable storage medium (e.g., single medium or multiple media), such as the storage device 1014, which includes complex programming instructions (e.g., complex computer-readable program code) to cause the processing circuitry 1002 to carry out actions described herein. Thus, the computer-readable program code of the computer program 1020 can comprise software instructions for implementing the functionality of the examples described herein when executed by the processing circuitry 1002. In some examples, the storage device 1014 may be a computer program product (e.g., readable storage medium) storing the computer program 1020 thereon, where at least a portion of a computer program 1020 may be loadable (e.g., into a processor) for implementing the functionality of the examples described herein when executed by the processing circuitry 1002. The processing circuitry 1002 may serve as a controller or control system for the computer system 1000 that is to implement the functionality described herein.

The computer system 1000 may include an input device interface 1022 configured to receive input and selections to be communicated to the computer system 1000 when executing instructions, such as from a keyboard, mouse, touch-sensitive surface, etc. Such input devices may be connected to the processing circuitry 1002 through the input device interface 1022 coupled to the system bus 1006 but can be connected through other interfaces, such as a parallel port, an Institute of Electrical and Electronic Engineers (IEEE) 1394 serial port, a Universal Serial Bus (USB) port, an IR interface, and the like. The computer system 1000 may include an output device interface 1024 configured to forward output, such as to a display, a video display unit (e.g., a liquid crystal display (LCD) or a cathode ray tube (CRT)). The computer system 1000 may include a communications interface 1026 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A computer system comprising a processor device configured to, for each vehicle charging station in a set of vehicle charging stations:
   receive topography data indicative of elevations within a predefined area around the vehicle charging station;
   determine, based on the topography data, a maximum possible altitude drop in relation to the vehicle charging station within the area; and
   determine, based on the maximum possible altitude drop and on a distance from the vehicle charging station to a position within the area defining the maximum altitude drop, a vehicle station ranking metric for the vehicle charging station, wherein the vehicle station ranking metric is determined in such a way that a vehicle charging station with a relatively large first maximum possible altitude drop is ranked lower than a vehicle charging station with a relatively small second maximum possible altitude drop, and wherein the vehicle station ranking metric is determined in such a way that, for a given maximum possible altitude drop, a vehicle charging station with a first relatively small distance to the position defining the maximum altitude drop is ranked lower than a vehicle charging station with a second relatively large distance to the position defining the maximum altitude drop.

2. The computer system of claim 1, the processor device being configured to provide data adapted to control a display device to present each vehicle charging station in the set of vehicle charging stations using a presentation format being indicative of the vehicle charging station ranking metric for the vehicle charging station.

3. The computer system of claim 1, wherein the received topography data for each vehicle charging station includes road topography data for possible road-bound routes starting from the charging station.

4. The computer system of claim 3, wherein the maximum possible altitude drop for each vehicle charging station is determined as a maximum altitude drop among altitude drops along the possible road-bound routes starting from the vehicle charging station.

5. The computer system of claim 1, the processor device being configured to, for each vehicle charging station in the set of vehicle charging stations:

determine, based on the maximum possible altitude drop within the area, a measure indicative of a maximum allowable charging level for a vehicle charging at the vehicle charging station, wherein the measure indicative of the maximum allowable charging level is determined in such a way that the maximum allowable charging level at a first vehicle charging station with a first relatively large maximum possible altitude drop is lower than the maximum allowable charging level at a second vehicle charging station with a second relatively small maximum possible altitude drop.

6. The computer system of claim 5, the processor device being configured to:

receive data indicative of a weight of the vehicle; and determine, for each vehicle charging station in the set of vehicle charging stations, the maximum allowable charging level additionally based on the weight of the vehicle.

7. A route planning system, for assisting a driver of an electric vehicle in planning a route, comprising:

the computer system of claim 2; and a display arrangement including a display device and a display controller, the display controller being configured to receive, from the computer system, data adapted to control the display device to present each vehicle charging station in the set of vehicle charging stations using a presentation format being indicative of the charge station ranking metric for the vehicle charging station.

8. A vehicle comprising a display arrangement including a display device and a display controller, the display controller being configured to receive, from the computer system according to claim 2, data adapted to control the display device to present each vehicle charging station in the first set of vehicle charging stations using a presentation format being indicative of the vehicle charging station ranking metric for the vehicle charging station.

9. A computer implemented method, comprising, for each vehicle charging station in a set of vehicle charging stations:

receiving, by processing circuitry of a computer system, topography data indicative of elevations within a predefined area around the vehicle charging station;

determining, based on the topography data, a maximum possible altitude drop in relation to the vehicle charging station within the area; and determining, based on the maximum possible altitude drop and on a distance from the vehicle charging station to a position within the area defining the maximum altitude drop, a vehicle station ranking metric for the vehicle charging station, wherein the vehicle station ranking metric is determined in such a way that a vehicle charging station with a first relatively large maximum possible altitude drop is ranked lower than a vehicle charging station with a second relatively small maximum possible altitude drop, and wherein the vehicle station ranking metric is determined in such a way that, for a given maximum possible altitude drop, a vehicle charging station with a first relatively small distance to the position defining the maximum altitude drop is ranked lower than a vehicle charging station with a second relatively large distance to the position defining the maximum altitude drop.

10. The method of claim 9, further comprising:

providing data adapted to control a display device to present each vehicle charging station in the set of vehicle charging stations using a presentation format being indicative of the vehicle charging station ranking metric for the vehicle charging station.

11. The method of claim 9, wherein the received topography data for each vehicle charging station includes road topography data for possible road-bound routes starting from the vehicle charging station.

12. A non-transitory computer-readable storage medium comprising instructions, which when executed by processing circuitry cause the processing circuitry to perform the method of claim 9.

* * * * *